US009137230B2

(12) United States Patent
Kaneshiro

(10) Patent No.: US 9,137,230 B2
(45) Date of Patent: Sep. 15, 2015

(54) INFORMATION PROCESSING APPARATUS, COMMUNICATION SYSTEM, AND COMPUTER-READABLE MEDIUM

(71) Applicant: FUJI XEROX CO., LTD., Minato-ku, Tokyo (JP)

(72) Inventor: Kazushi Kaneshiro, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/066,820

(22) Filed: Oct. 30, 2013

(65) Prior Publication Data

US 2014/0289798 A1      Sep. 25, 2014

(30) Foreign Application Priority Data

Mar. 21, 2013   (JP) ................................. 2013-057901

(51) Int. Cl.
*H04L 29/06* (2006.01)
*H04W 12/06* (2009.01)
*G06F 21/31* (2013.01)

(52) U.S. Cl.
CPC ............... *H04L 63/08* (2013.01); *G06F 21/31* (2013.01); *H04L 63/105* (2013.01); *H04W 12/06* (2013.01)

(58) Field of Classification Search
CPC ..................................................... H04L 63/08
USPC ......................................................... 726/29
See application file for complete search history.

(56) References Cited

U.S. PATENT DOCUMENTS

| 8,561,160 | B2* | 10/2013 | Kino | 726/7 |
| 8,881,240 | B1* | 11/2014 | Malik et al. | 726/4 |
| 2008/0127311 | A1* | 5/2008 | Yasaki et al. | 726/4 |
| 2011/0047606 | A1* | 2/2011 | Blomquist et al. | 726/7 |
| 2011/0145897 | A1* | 6/2011 | Tyree | 726/6 |
| 2011/0238764 | A1* | 9/2011 | Shibata | 709/206 |
| 2012/0254955 | A1* | 10/2012 | Suginaka et al. | 726/4 |
| 2013/0212248 | A1* | 8/2013 | Neafsey et al. | 709/223 |

FOREIGN PATENT DOCUMENTS

JP           2006-27019 A      2/2006

* cited by examiner

*Primary Examiner* — Mohammad L Rahman
(74) *Attorney, Agent, or Firm* — Sughrue Mion, PLLC

(57) ABSTRACT

An information processing apparatus includes a request information reception unit that receives a request for information processing from a client apparatus, an inquiry information transmission unit that inquires about the presence of authentication information for the information processing, first and second determination units, a prompt information transmission unit, an acquisition information reception unit, and a process start unit. If the first determination unit determines that any piece of the authentication information is missing, using a response to the inquiry, the second determination unit determines whether a second apparatus is to be prompted to obtain the missing authentication information, based on predetermined information. If the determination result is positive, the prompt information transmission unit transmits a prompt to the second apparatus. When the acquisition information reception unit receives an acquisition notification of the missing authentication information from the second apparatus, the process start unit starts the information processing.

12 Claims, 10 Drawing Sheets

| USER ID | SERVICE ID | VIA-APPARATUS | AUTHENTICATION INFORMATION | FLOW |
|---|---|---|---|---|
| User01 | 001 | RELAY APPARATUS | PRESENCE | ... |
| | 001 | FLOW MANAGEMENT APPARATUS | ABSENCE | FLOW ID: 0002 |
| | 002 | RELAY APPARATUS | PRESENCE | ... |
| | ... | ... | ... | ... |
| ⋮ | ⋮ | ⋮ | ⋮ | ⋮ |

| FLOW 0002 ||
|---|---|
| TASK | AUTHENTICATION INFORMATION |
| IMAGE ROTATION | UNNECESSARY |
| CHARACTER RECOGNITION | UNNECESSARY |
| EXTERNAL SERVICE OF TRANSLATION | NONE |
| CONVERSION INTO PDF | UNNECESSARY |

# INFORMATION PROCESSING APPARATUS, COMMUNICATION SYSTEM, AND COMPUTER-READABLE MEDIUM

CROSS-REFERENCE TO RELATED APPLICATIONS

This application is based on and claims priority under 35 USC 119 from Japanese Patent Application No. 2013-057901 filed Mar. 21, 2013.

BACKGROUND (i) Technical Field

The present invention relates to an information processing apparatus, a communication system, and a computer-readable medium.

(ii) Related Art

A service called a cloud service or cloud computing is known. In such a service, for example, servers on a network, instead of client apparatuses, perform various types of information processing, such as data storage and data format conversion.

SUMMARY

According to an aspect of the present invention, there is provided an information processing apparatus including a request information reception unit, an inquiry information transmission unit, a first determination unit, a second determination unit, a prompt information transmission unit, an acquisition information reception unit, and a process start unit. The request information reception unit receives request information for requesting one or more steps of information processing, from a client apparatus. The inquiry information transmission unit transmits inquiry information for inquiring about the presence or lack of authentication information indicating that each of the one or more steps of information processing is permitted to be performed, to an authentication management apparatus. The first determination unit determines whether or not any piece of authentication information required for the one or more steps of information processing is missing, on the basis of a response to the inquiry information from the authentication management apparatus. If the first determination unit determines that any piece of authentication information is missing, the second determination unit determines whether or not prompt information for prompting acquisition of the missing authentication information is to be transmitted to a second apparatus different from the client apparatus, on the basis of predetermined information. If the second determination unit determines that the prompt information is to be transmitted to the second apparatus, the prompt information transmission unit transmits the prompt information to the second apparatus. The acquisition information reception unit receives an acquisition notification indicating that the missing authentication information has been obtained, from the second apparatus. The process start unit starts the one or more steps of information processing when the acquisition information reception unit receives the acquisition notification.

BRIEF DESCRIPTION OF THE DRAWINGS

Exemplary embodiments of the present invention will be described in detail based on the following figures, wherein.

DETAILED DESCRIPTION

Configuration

Figure 1:
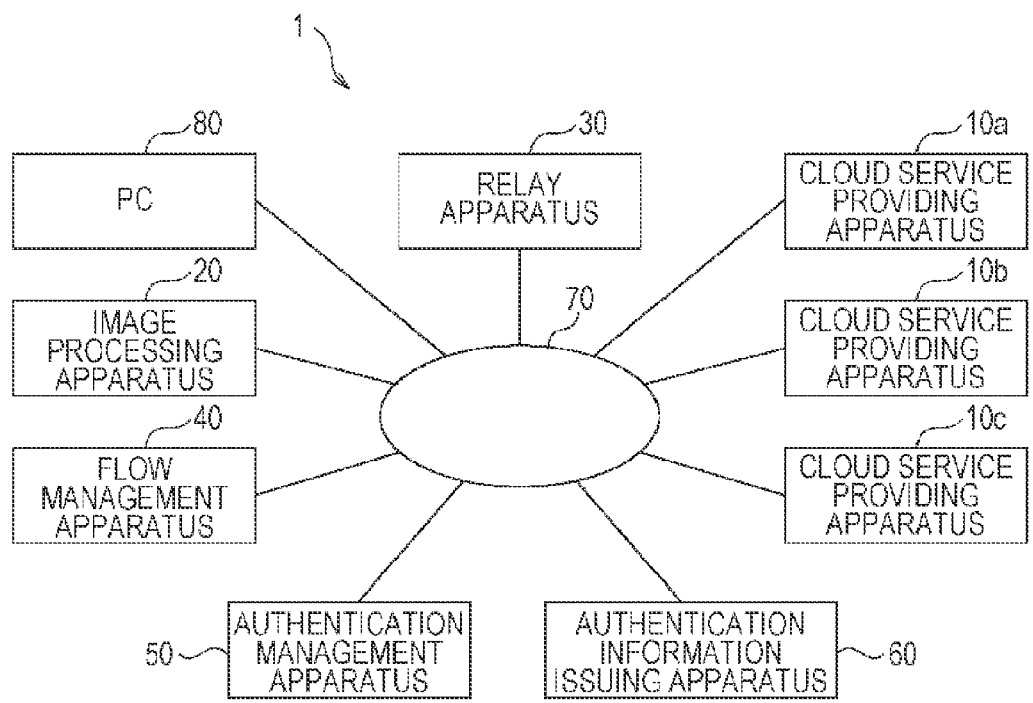
FIG. 1 is a block diagram illustrating the overall configuration of a communication system.

FIG. 1 is a block diagram illustrating the overall configuration of a communication system 1 according to one exemplary embodiment of the present invention. The communication system 1 includes cloud service providing apparatuses 10a, 10b, and 10c, an image processing apparatus 20, a relay apparatus 30, a flow management apparatus 40, an authentication management apparatus 50, an authentication information issuing apparatus 60, and a personal computer (hereinafter, referred to as a "PC") 80. The cloud service providing apparatuses 10a, 10b, and 10c are servers which provide so-called cloud services. Cloud services herein are services in which servers on a network perform various types of information processing, such as data storage and provision. The cloud service providing apparatuses 10a, 10b, and 10c each have a similar hardware configuration and similar operations. Hereinafter, the cloud service providing apparatuses 10a, 10b, and 10c each are called a cloud service providing apparatus 10 except when these are to be separately described.

The image processing apparatus 20 is a client apparatus which receives services, such as data storage, data search, data retrieval, and calculation, provided by the cloud service providing apparatuses 10. In the exemplary embodiment, the image processing apparatus 20 has a print function and a scanner function. A network 70 which is a communication network connecting the image processing apparatus 20, the relay apparatus 30, the flow management apparatus 40, the cloud service providing apparatuses 10, the authentication management apparatus 50, and the authentication information issuing apparatus 60 to each other is, for example, the Internet.

The relay apparatus 30 relays data transmitted between a cloud service providing apparatus 10 and the image processing apparatus 20, when the image processing apparatus 20 transmits data so as to store data in a storage service provided by the cloud service providing apparatus 10, or when the image processing apparatus 20 searches for and obtains data stored in the cloud service providing apparatus 10. More specifically, when the relay apparatus 30 receives data which is, for example, to be stored, from the image processing apparatus 20, the relay apparatus 30 transfers the data to a cloud service providing apparatus 10. When the relay apparatus 30 receives data which is to be printed, from a cloud service providing apparatus 10, the relay apparatus 30 transfers the data to the image processing apparatus 20.

The flow management apparatus 40 manages information processing performed on data relayed by the relay apparatus 30. In the exemplary embodiment, a user is allowed to use one or more cloud services provided by the cloud service providing apparatuses 10, to process data. The flow management apparatus 40 requests a cloud service providing apparatus 10 to carry out a service selected by a user, in accordance with data transmitted from the relay apparatus 30. In the description below, for convenience of description, a process of subjecting data to information processing, which is performed by the flow management apparatus 40, is called a "task process". An operation sequence which is set as a procedure of a sequence of task processes is called a "flow". In the flow management apparatus 40, multiple flows are registered in advance. When a user specifies a flow, the flow management apparatus 40 performs a sequence of task processes corresponding to the specified flow, on data transmitted from the relay apparatus 30.

The authentication management apparatus 50 manages information about authentication and information about a user, such as a mail address. The authentication management apparatus 50 stores authentication information which indicates that a service provided by a cloud service providing apparatus 10 is permitted to be used, for each user (or each device). The authentication information issuing apparatus 60 issues authentication information which indicates that a service provided by a cloud service providing apparatus 10 is permitted to be used. Some task processes may require authentication information corresponding to a user when the user accesses external services (cloud service providing apparatuses 10). When authentication information is required, the flow management apparatus 40 transmits an inquiry to the authentication management apparatus 50 so as to obtain authentication information from the authentication management apparatus 50, and executes a task by using the obtained authentication information. The PC 80 is a computer used by a user of the image processing apparatus 20.

Figure 2:
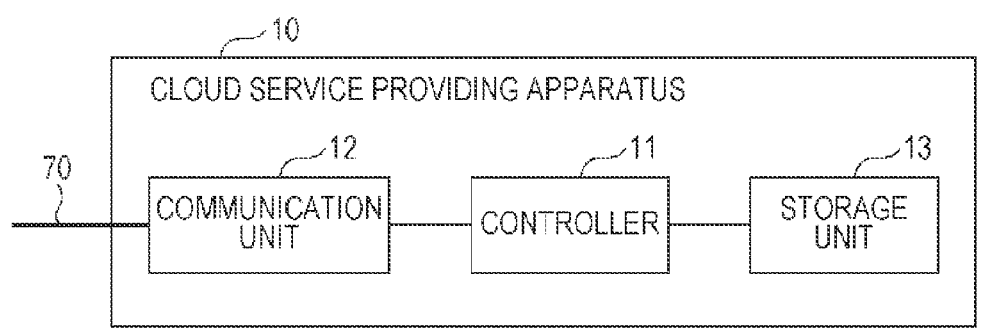
FIG. 2 is a diagram illustrating the hardware configuration of a cloud service providing apparatus.

FIG. 2 is a diagram illustrating the hardware configuration of a cloud service providing apparatus 10. In FIG. 2, a controller 11 includes an arithmetic and logic unit such as a central processing unit (CPU) and main storages, such as a read only memory (ROM) and a random access memory (RAM). The arithmetic and logic unit uses the RAM as a work area and executes programs stored in the ROM and a storage unit 13, thereby controlling operations of units of the cloud service providing apparatus 10. A communication unit 12 communicates via the network 70 with another apparatus, such as the relay apparatus 30 or the flow management apparatus 40. The storage unit 13 is a storage device such as a hard disk, and stores data and programs which are used by the controller 11. The storage unit 13 stores data transmitted from the image processing apparatus 20 via the relay apparatus 30.

Figure 3:
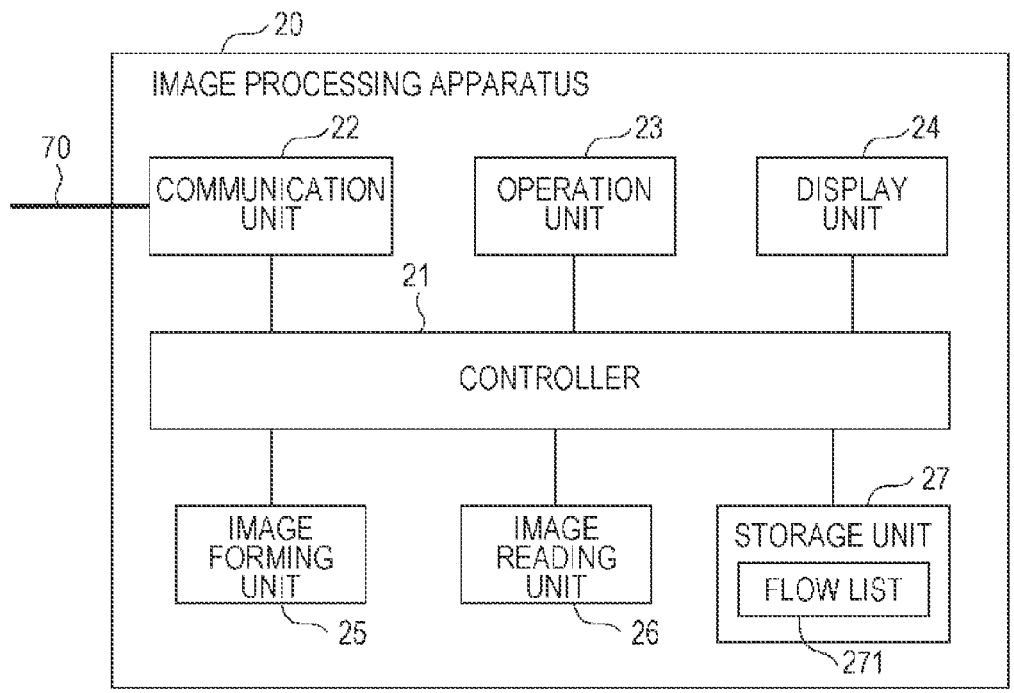
FIG. 3A is a diagram illustrating the hardware configuration of an image processing apparatus.
FIG. 3B is a diagram illustrating an exemplary flow list.

FIG. 3A is a diagram illustrating the hardware configuration of the image processing apparatus 20. In FIG. 3A, a controller 21 includes an arithmetic and logic unit such as a CPU and main storages, such as a ROM and a RAM. The ROM stores programs executed by the arithmetic and logic unit. The arithmetic and logic unit uses the RAM as a work area and executes programs stored in the ROM and a storage unit 27, thereby controlling operations of units of the image processing apparatus 20. A communication unit 22 communicates via the network 70 with another apparatus, such as the relay apparatus 30. An operation unit 23 includes operators, such as various keys and a touch sensor, and supplies an operation signal corresponding to a user operation to the controller 21. The controller 21 performs processing corresponding to the operation signal. A display unit 24 includes a liquid crystal panel and a liquid-crystal driving circuit, and displays an image under the control exerted by the controller 21. An image forming unit 25 forms an image by using an electrophotographic system on a recording medium such as a sheet of paper. An image reading unit 26 optically reads out an image on a document. The storage unit 27 is a storage device such as a hard disk, and stores data and programs which are used by the controller 21. The storage unit 27 stores a flow list 271 which is a set of pieces of information indicating a flow which is set in advance in the flow management apparatus 40 (hereinafter, referred to as "flow information").

FIG. 3B is a diagram illustrating an exemplary flow list. The flow list illustrated in FIG. 3B has pieces of flow information in which items of "flow ID", "task 1", "task 2", "task 3", and "task 4" are associated with each other. The item "flow ID" stores identification information for identifying a flow. The items of "task 1", "task 2", "task 3", and "task 4" store information for identifying a task process. Specifically, for example, in the example illustrated in FIG. 3B, information indicating a sequence of task processes of "noise removal", "image rotation", "character recognition", "format conversion", and "storage in the cloud service A (which is an external service)" is stored as a flow whose flow ID is 0001. Information indicating a sequence of task processes of "image rotation", "character recognition", "request for external service of translation", and "conversion into Portable Document Format (PDF)" is stored as a flow whose flow ID is 0002. A user of the image processing apparatus 20 uses the operation unit 23 to select a flow which is to be used to process data. In the example in FIG. 3B, flow information constituted by four task processes is illustrated. The number of task processes included in each piece of flow information is not limited to four, and may be more than four or less than four. In the exemplary embodiment, the case in which a flow list is stored in advance in the storage unit 27 of the image processing apparatus 20 will be described. The present invention is not limited to this. The image processing apparatus 20 may transmit an inquiry to the flow management apparatus 40 so as to obtain a flow list from the flow management apparatus 40.

Figure 4:
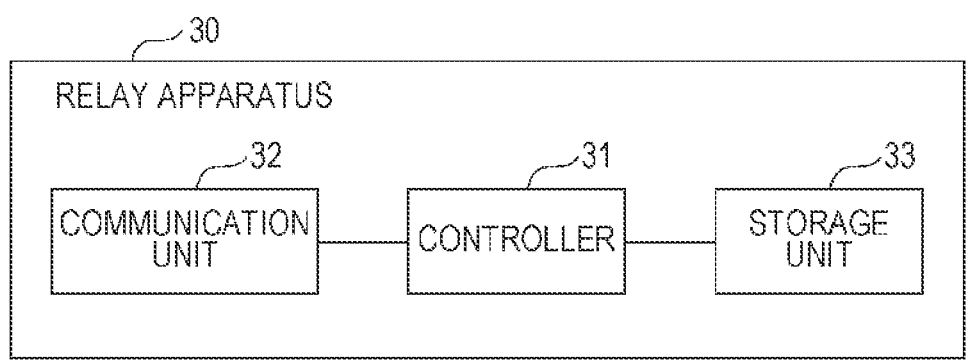
FIG. 4 is a diagram illustrating the hardware configuration of a relay apparatus.

FIG. 4 is a diagram illustrating the hardware configuration of the relay apparatus 30. In FIG. 4, a controller 31 includes an arithmetic and logic unit such as a CPU and main storages, such as a ROM and a RAM. The arithmetic and logic unit uses the RAM as a work area and executes programs stored in the ROM and a storage unit 33, thereby controlling operations of units of the relay apparatus 30. A communication unit 32 communicates via the network 70 with another apparatus, such as the image processing apparatus 20, a cloud service providing apparatus 10, the flow management apparatus 40, or the authentication management apparatus 50. The storage unit 33 is a storage device such as a hard disk, and stores data and programs which are used by the controller 31.

Figure 5:
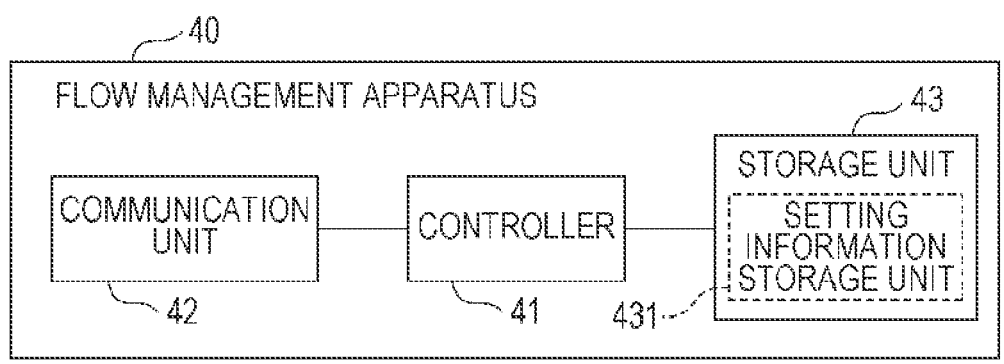
FIG. 5 is a diagram illustrating the hardware configuration of a flow management apparatus.

FIG. 5 is a diagram illustrating the hardware configuration of the flow management apparatus 40. In FIG. 5, a controller 41 includes an arithmetic and logic unit such as a CPU and main storages, such as a ROM and a RAM. The arithmetic and logic unit uses the RAM as a work area and executes programs stored in the ROM and a storage unit 43, thereby controlling operations of units of the flow management apparatus 40. A communication unit 42 communicates via the network 70 with another apparatus, such as the relay apparatus 30, a cloud service providing apparatus 10, or the authentication management apparatus 50. The storage unit 43 is a storage device such as a hard disk, and stores data and programs which are used by the controller 41.

Figures 6A, 6B, 6C:
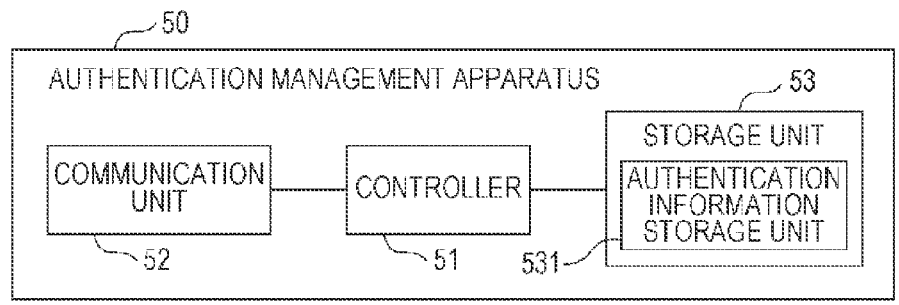
FIG. 6A is a diagram illustrating the hardware configuration of an authentication management apparatus.
FIG. 6B is a diagram illustrating exemplary data stored in an authentication information storage unit.
FIG. 6C is a diagram illustrating exemplary data stored in the authentication information storage unit.

FIG. 6A is a diagram illustrating the hardware configuration of the authentication management apparatus 50. In FIG. 6A, a controller 51 includes an arithmetic and logic unit such as a CPU and main storages, such as a ROM and a RAM. The arithmetic and logic unit uses the RAM as a work area and executes programs stored in the ROM and a storage unit 53, thereby controlling operations of units of the authentication management apparatus 50. A communication unit 52 communicates via the network 70 with another apparatus, such as the relay apparatus 30 or a cloud service providing apparatus 10. The storage unit 53 is a storage device such as a hard disk, and stores data and programs which are used by the controller 51. The storage unit 53 includes an authentication information storage unit 531. The authentication information storage unit 531 stores authentication information which is required when a cloud service providing apparatus 10 is accessed.

FIG. 6B is a diagram illustrating exemplary data stored in the authentication information storage unit 531. As illustrated in FIG. 6B, the authentication information storage unit 531 stores items of, for example, "user ID", "service ID", "via-apparatus", and "authentication information" which are associated with each other. Among these items, the item "user ID" stores identification information (user ID) for identifying a user. The item "service ID" stores identification information for identifying a sequence of processes in a service provided by a cloud service providing apparatus 10. The item "via-apparatus" stores information indicating an apparatus, via which data is transmitted or which relays data, i.e., an apparatus which accesses a cloud service providing apparatus 10. The authentication information provided for the case in which the "via-apparatus" is the "relay apparatus" is authentication information which is required when access is performed via the relay apparatus 30. In contrast, authentication information provided for the case in which the "via-apparatus" is the "flow management apparatus" is authentication information which is required when access is performed via the flow management apparatus 40. The item "authentication information" stores information indicating the presence or lack of authentication information which is required when a user identified with the "user ID" accesses a cloud service providing apparatus 10 providing a service identified with the "service ID". When the "via-apparatus" is the "flow management apparatus", information about a flow to be used is stored. In the case of FIG. 6B, a flow to be used in a service whose service ID is 001 is a flow whose flow ID is 0002. In FIG. 6C, information indicating whether or not authentication information is required, for each of the tasks constituting a flow and information indicating the presence or lack of authentication information for a task which requires authentication information are stored. Among the tasks constituting a flow whose flow ID is 0002, the tasks of image rotation, character recognition, and conversion into PDF are executed by the flow management apparatus 40. Accordingly, no authentication information is required. An external service of translation is a service provided outside of the flow management apparatus 40. Accordingly, authentication information is required when a translation is requested. The example in FIG. 6C indicates that the authentication information storage unit 531 stores no authentication information for the external service of translation.

The image processing apparatus 20 accesses a cloud service providing apparatus 10 via the relay apparatus 30, or accesses a cloud service providing apparatus 10 via the relay apparatus 30 and the flow management apparatus 40. In the former case, the image processing apparatus 20 needs to use authentication information provided for the case in which the value of the item "via-apparatus" is "relay apparatus". In contrast, in the latter case, the image processing apparatus 20 uses authentication information provided for the case in which the value of the item "via-apparatus" is "flow management apparatus" so as to access a cloud service providing apparatus 10.

The storage unit 53 stores a mail address registered by a user in advance, for each user ID. The authentication management apparatus 50 transmits a mail address to the image processing apparatus 20 in response to an inquiry from the image processing apparatus 20.

Figure 7:
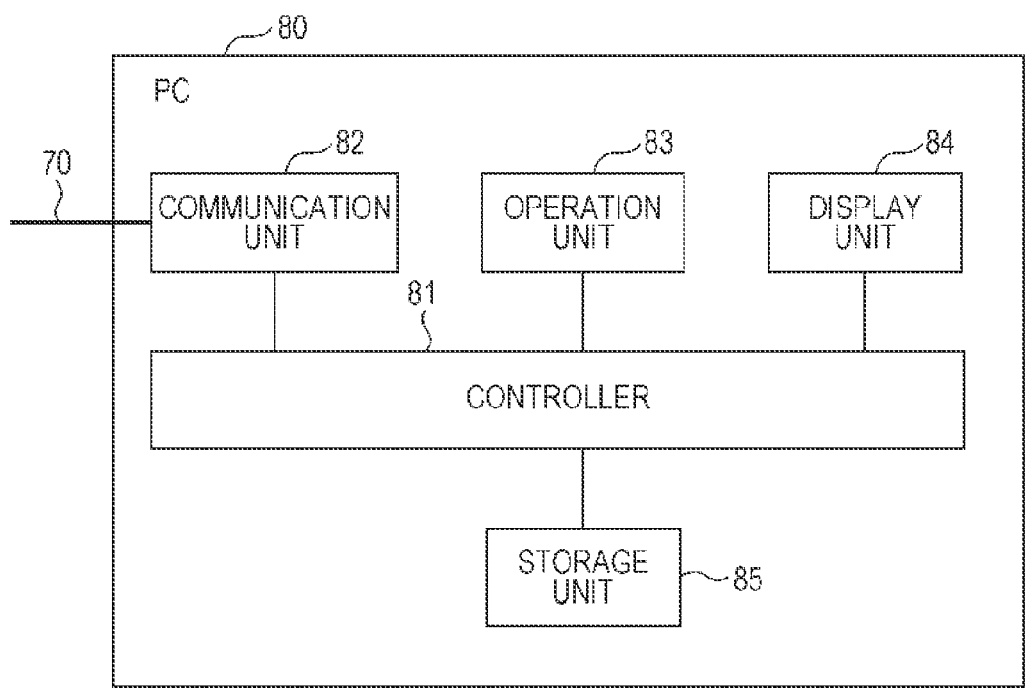
FIG. 7 is a diagram illustrating an exemplary hardware configuration of a personal computer (PC)

FIG. 7 is a diagram illustrating the hardware configuration of the PC 80. In FIG. 7, a controller 81 includes an arithmetic and logic unit such as a CPU and main storages, such as a ROM and a RAM. The ROM stores programs executed by the arithmetic and logic unit. The arithmetic and logic unit uses the RAM as a work area and executes programs stored in the ROM and a storage unit 85, thereby controlling operations of units of the PC 80. A communication unit 82 communicates via the network 70 with another apparatus such as the flow management apparatus 40. An operation unit 83 includes operators, such as a keyboard and a mouse, and supplies an operation signal corresponding to a user operation to the controller 81. The controller 81 performs processing corresponding to the operation signal. A display unit 84 includes a liquid crystal panel and a liquid-crystal driving circuit, and displays an image under the control exerted by the controller 81. The storage unit 85 is a storage device such as a hard disk, and stores data and programs which are used by the controller 81.

Figure 8:
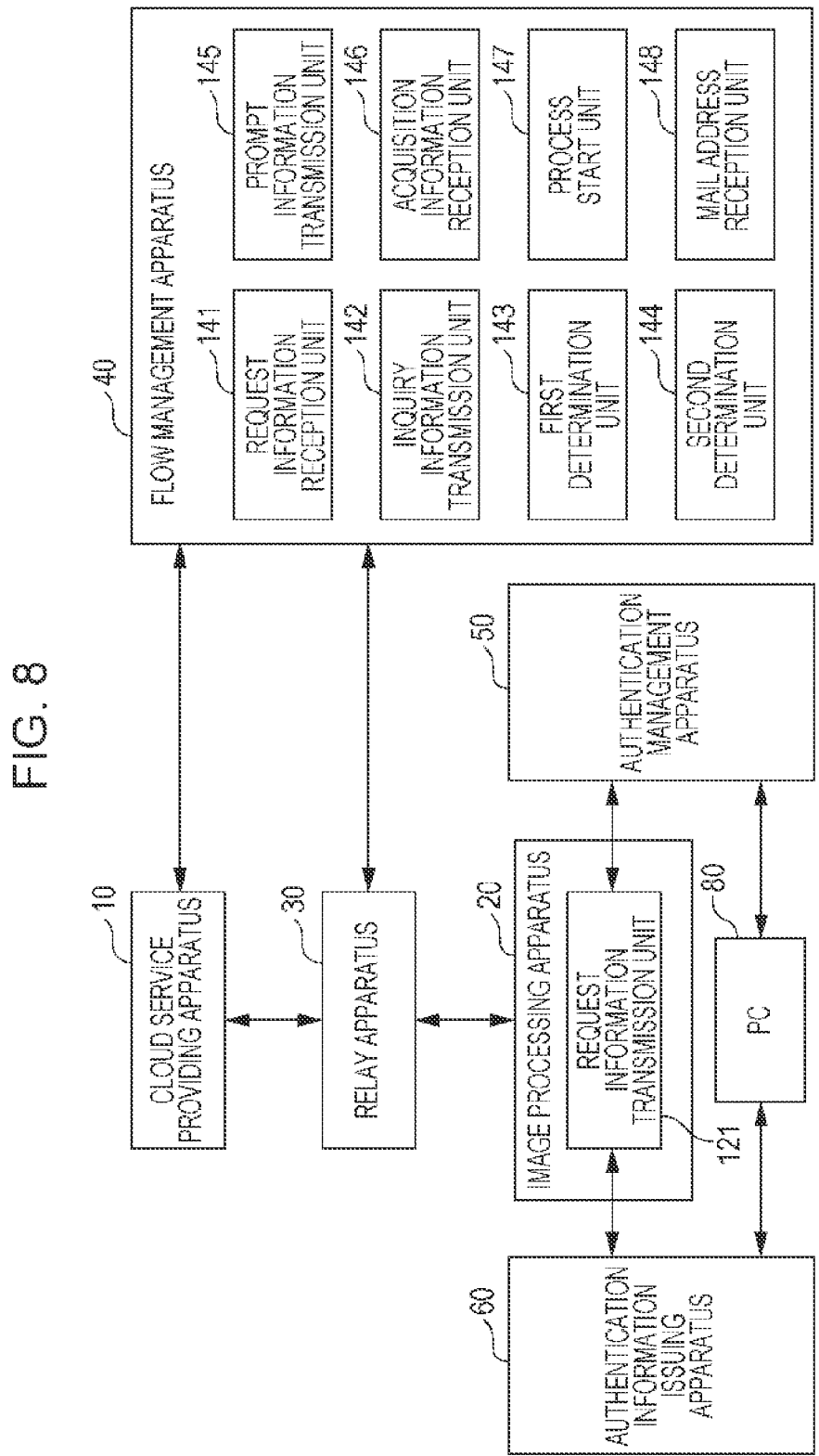
FIG. 8 is a diagram illustrating the functional configuration of a communication system.

FIG. 8 is a diagram illustrating the functional configuration of the communication system 1. The image processing apparatus 20 achieves a request information transmission unit 121 by using the controller 21 or by using the controller 21 and the communication unit 22. The request information transmission unit 121 transmits request information for requesting one or more steps of information processing, to the relay apparatus 30. In the exemplary embodiment, the request information transmission unit 121 transmits request information including the flow ID identifying a flow and the model ID (attribute information) for identifying the model (attribute) of the image processing apparatus 20, to the relay apparatus 30 in accordance with information which is output from the operation unit 23 operated by a user. The relay apparatus 30 issues a "service ID" corresponding to the received request information.

The flow management apparatus 40 achieves a request information reception unit 141, an inquiry information transmission unit 142, a first determination unit 143, a second determination unit 144, a prompt information transmission unit 145, an acquisition information reception unit 146, a process start unit 147, and a mail address reception unit 148 by using the controller 41 or by using the controller 41 and the communication unit 42. In the description about the functional configuration of the flow management apparatus 40, to understand the units easily, a flow of processes performed by the units will be described with reference to the flowchart illustrated in FIG. 9. The request information reception unit 141 receives request information for requesting one or more steps of information processing, from the image processing apparatus 20 (in step S1 in FIG. 9). In the exemplary embodiment, the request information reception unit 141 receives request information including a service ID and a flow ID for identifying a flow through which data is to be processed, from the relay apparatus 30. The request information includes the model ID for identifying the model of the image processing apparatus 20 as described above.

The inquiry information transmission unit 142 transmits information for inquiring about the presence or lack of authentication information indicating that information processing is permitted, for each of the one or more steps of information processing, to the authentication management apparatus 50. In the exemplary embodiment, the inquiry information transmission unit 142 transmits the service ID, and the flow ID and the user ID received from the image processing apparatus 20, to the authentication management apparatus 50, thereby transmitting an inquiry. The authentication management apparatus 50 searches the authentication information storage unit 531 for authentication information on the basis of the user ID, the service ID, and the flow ID which are received, and transmits a response to the inquiry information which indicates the presence or lack of authentication information. The first determination unit 143 determines whether or not any piece of authentication information is not present, i.e., whether or not any piece of authentication information required for the one or more steps of information processing is missing, on the basis of the response to the inquiry information from the authentication management apparatus 50 (in step S2). At that time, the mail address reception unit 148 receives a mail address corresponding to the user ID for which the inquiry has been transmitted, from the authentication management apparatus 50 as a response to the inquiry.

If the first determination unit 143 determines that any piece of authentication information is missing, the second determination unit 144 determines whether or not prompt information for prompting acquisition of the missing authentication information is to be transmitted to another apparatus different from the image processing apparatus 20, on the basis of predetermined information (in step S3). In the exemplary embodiment, the second determination unit 144 performs the determination on the basis of the model ID which is included in the request information and which is received from the image processing apparatus 20. In the exemplary embodiment, if the received model ID satisfies the predetermined condition, i.e., if the user interface (UI) seems not to be poor, the second determination unit 144 determines that the information for prompting acquisition of the authentication information is to be transmitted to the image processing apparatus 20. Otherwise (if the UI seems to be poor), the second determination unit 144 determines that the prompt information for prompting acquisition of the missing authentication information is to be transmitted to another apparatus different from the image processing apparatus 20. Examples of a condition under which the UI is determined to be poor include a case in which the display unit included in the image processing apparatus 20 has a display resolution or the number of pixels for display which is smaller than a predetermined value, and a case in which the image processing apparatus 20 is not provided with a function of inputting authentication information. A model ID whose UI is poor may be stored in the second determination unit 144 in advance on the basis of the condition, and whether or not the UI is poor may be determined on the basis of the model ID included in the obtained request information. Alternatively, when the model ID included in the obtained request information describes information about the display resolution or the number of pixels for display, whether or not the UI is poor may be determined on the basis of the display resolution or the number of pixels for display.

If the second determination unit 144 determines that the model ID satisfies the predetermined condition, i.e., that the UI is not poor, the prompt information transmission unit 145 transmits the prompt information for prompting acquisition of the missing authentication information, e.g., information indicating a screen for inputting a user ID and a password (hereinafter referred to as "user information"), to the image processing apparatus 20 which has transmitted the request (in step S4). In this case, the user checks a screen displayed on the display unit 24 of the image processing apparatus 20, and uses the operation unit 23 of the image processing apparatus 20 to perform an operation for obtaining the authentication information (in step S6). In this case, the UI of the image processing apparatus 20 is not poor. Accordingly, the user is less likely to feel troublesome in performing an operation for obtaining the authentication information.

If the second determination unit 144 determines that the model ID does not satisfy the predetermined condition, i.e., that the UI is poor, the prompt information transmission unit 145 transmits the prompt information to another apparatus (in step S5). In the exemplary embodiment, the prompt information transmission unit 145 transmits the prompt information to the mail address obtained by the mail address reception unit 148. The user receives the transmitted mail through a terminal apparatus. The terminal apparatus which functions as an apparatus cooperating with the image processing apparatus 20 so as to prompt a user to obtain the authentication information is hereinafter referred to as a "cooperating device".

The user uses the cooperating device to perform an operation for obtaining the authentication information (in step S6), in response to the prompt. The cooperating device which has obtained the authentication information transmits an acquisition notification indicating that acquisition is successfully performed, to the flow management apparatus 40. The acquisition information reception unit 146 receives the acquisition notification indicating that the missing authentication information is obtained, from the cooperating device.

When the acquisition information reception unit 146 receives the acquisition notification, the process start unit 147 starts the task processes executed on data, i.e., starts the flow (in step S7). Specifically, in the exemplary embodiment, the process start unit 147 transmits data to cloud service providing apparatuses 10 providing services requested for the data, and requests the cloud service providing apparatuses 10 to perform information processing.

Figure 9:
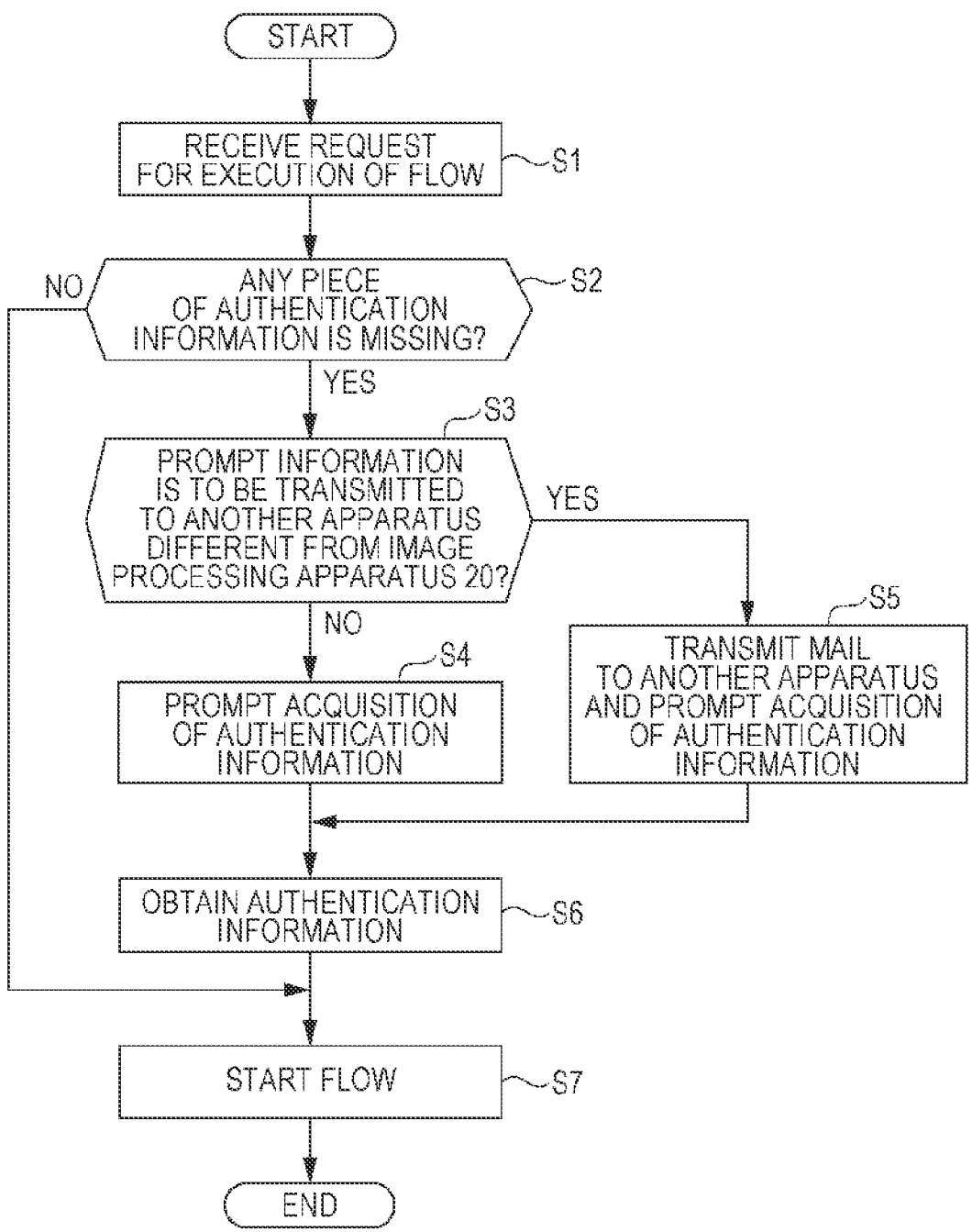
FIG. 9 is a flowchart of a process performed by a flow management apparatus.

In step S2 in FIG. 9, if the first determination unit 143 determines that no missing authentication information is present (NO in step S2), the processes performed by the second determination unit 144, the prompt information transmission unit 145, and the acquisition information reception unit 146 are not performed, and the task processes are executed on the data, i.e., the flow is started (in step S7).

Exemplary Operation

Flow Process Performed when Acquisition of Authentication Information is Performed in Image Processing Apparatus 20

An exemplary operation in the exemplary embodiment will be described with reference to the sequence chart illustrated in FIG. 10. In the exemplary operation, the case where the image processing apparatus 20 whose UI is not poor is used to perform the flow process will be described. In the exemplary operation below, an operation in which a user U scans multiple sheets of paper (recording medium) by using the image processing apparatus 20, and in which the resulting data is accumulated as image data in a cloud service providing apparatus 10 will be described. At that time, the user U uses the operation unit 23 of the image processing apparatus 20 to specify a flow which is to be used for the image data to be accumulated. The user U scans multiple sheets of paper by using the image processing apparatus 20. Image data representing images which are read out by using the image reading unit 26 is generated, and the generated image data is temporarily accumulated in the storage unit 27. The controller 21 of the image processing apparatus 20 transmits request information including the flow ID indicating the flow specified by the user U, the model ID of the image processing apparatus 20, and the user ID for identifying the user U, to the relay apparatus 30 in accordance with information which is output from the operation unit 23 (in step S21).

Upon reception of the request information from the image processing apparatus 20, the controller 31 of the relay apparatus 30 transmits the received user ID to the authentication management apparatus 50, thereby performing user authentication (in step S22). The controller 31 receives information about the user, such as a mail address, as a response. Then, the controller 31 transmits the flow ID indicating the specified flow to the flow management apparatus 40, and instructs the flow management apparatus 40 to check if any piece of authentication information required for the task processes included in the specified flow is missing (in step S23). Hereinafter, for convenience of description, the instruction to check if any piece of authentication information is missing is referred to as a "preliminary call".

Upon invocation of the preliminary call from the relay apparatus 30, the controller 41 of the flow management apparatus 40 transmits an inquiry about whether or not any piece of authentication information required to execute the task processes included in the specified flow is missing, to the authentication management apparatus 50 (in step S24). The inquiry includes the user ID and one or more service IDs. The authentication management apparatus 50 searches the authentication information storage unit 531 for the combination of each of the service IDs and the user ID which are transmitted from the flow management apparatus 40, and determines whether or not authentication information is stored. Different authentication information is used for each service or each task as described above. A flow may include multiple tasks, and pieces of authentication information for all of the tasks are required to execute the tasks. If some (or all) of the pieces of authentication information are missing, the authentication management apparatus 50 transmits service IDs or task IDs corresponding to the missing pieces of authentication information, i.e., the pieces of authentication information which are not stored in the authentication information storage unit 531, to the flow management apparatus 40 (in step S25).

If no authentication information is missing, the controller 41 proceeds to step S33 and its subsequent steps without performing step S26, and obtains all pieces of authentication information required to execute the task processes included in the flow, from the authentication management apparatus 50 (in step S33). Then, the controller 41 executes each task process by using the obtained authentication information (in steps S34 and S35). The controller 41 of the flow management apparatus 40 determines whether or not any piece of authentication information is missing, on the basis of whether or not the controller 41 receives service IDs from the authentication management apparatus 50. If any piece of authentication information is missing, the controller 41 determines whether or not acquisition of the authentication information is to be performed in the cooperating device, on the basis of the model ID received in step S21 (in step S251). In the exemplary embodiment, the controller 41 determines whether or not the model ID received in step S21 matches a predetermined value, thereby determining whether or not acquisition of the authentication information is to be performed in the cooperating device. In the exemplary operation, the operation performed when the image processing apparatus 20 which has requested execution of the flow is requested to obtain the authentication information is described. The operation performed when the cooperating device is requested to obtain the authentication information will be described with reference to FIG. 11 below.

If the controller 41 determines that the image processing apparatus 20 which has requested execution of the flow is to be requested to obtain the authentication information in step S251, the controller 41 of the flow management apparatus 40 transmits information for obtaining the authentication information corresponding to the service IDs transmitted from the authentication management apparatus 50, e.g., the uniform resource locator (URL) of the authentication information issuing apparatus 60, to the relay apparatus 30 as a response to the preliminary call (in step S26).

Upon reception of the information for obtaining the authentication information from the flow management apparatus 40, the controller 31 of the relay apparatus 30 transmits prompt information for prompting a user to obtain the authentication information, such as information representing a screen for prompting a user to input user information so that authentication information is issued and is stored in the authentication management apparatus 50, to the image processing apparatus 20 on the basis of the received information (in step S27).

Upon reception of the prompt information from the relay apparatus 30, the image processing apparatus 20 displays a screen for prompting acquisition of the authentication information, on the display unit 24 in accordance with the received prompt information. An example of the screen displayed on the display unit 24 is a screen in which a message "Authentication information is required to execute the task XX. Obtain the authentication information from the following URL." is displayed, and a URL of the authentication information issuing apparatus 60 may be displayed.

The user U uses the operation unit 23 of the image processing apparatus 20 to obtain the authentication information. Specifically, for example, the user U may input the user ID and a password (user information). The controller 21 of the image processing apparatus 20 transmits the user information to the authentication information issuing apparatus 60 in accordance with information which is output from the operation unit 23 (in step S28). The authentication information issuing apparatus 60 issues authentication information corresponding to the received user information, and transmits it to the image processing apparatus 20 as a response (in step S29). The controller 21 of the image processing apparatus 20 transmits the authentication information received from the authentication information issuing apparatus 60, to the authentication management apparatus 50 (in step S30). Upon reception of the authentication information from the image processing apparatus 20, the authentication management apparatus 50 stores the received authentication information in the authentication information storage unit 531.

The processes from steps S23 to S30 described above are performed. Accordingly, even when any piece of authentication information required to execute the task processes corresponding to the specified flow is missing, i.e., when any piece of authentication information is not stored in the authentication management apparatus 50, the missing authentication information is obtained in accordance with a user operation, and is stored in the authentication management apparatus 50.

After the missing authentication information is stored, the controller 21 of the image processing apparatus 20 transmits an instruction to execute the flow (in step S31). Specifically, the controller 21 transmits image data generated by the image reading unit 26 (image data accumulated in the storage unit 27) and the flow ID indicating the specified flow, to the relay apparatus 30. In the exemplary embodiment, multiple sheets of paper are scanned at the timing at which the user U specifies the flow. The present invention is not limited to this. The sheets may be scanned in step S31 so that image data is generated. Upon reception of the image data from the image processing apparatus 20, the controller 31 of the relay apparatus 30 transmits the received image data to the flow management apparatus 40, and invokes the flow (in step S32).

The flow management apparatus 40 obtains authentication information required to execute the task processes included in the specified flow, from the authentication management apparatus 50 (in step S33), and uses the obtained authentication information to execute the task processes included in the specified flow sequentially (in steps S34 and S35). In the example in FIG. 10, the flow management apparatus 40 requests the cloud service providing apparatus 10*a* to execute a process "task 1", and requests the cloud service providing apparatus 10*b* to execute a process "task 2". In this case, the authentication information obtained in step S33 is used when the cloud service providing apparatus 10*a* and the cloud service providing apparatus 10*b* are accessed. If necessary authentication information fails to be obtained in step S33, the controller 41 performs the processes in step S26 and its subsequent steps again, and prompts the user U to obtain the authentication information.

Flow Process Performed when Acquisition of Authentication Information is Performed in Cooperating Device Another exemplary operation in the exemplary embodiment will be described with reference to FIG. 11. In the exemplary operation, it is assumed that the UI of the image processing apparatus 20 is poor and that it is difficult for the user U to input user information by using the UI of the image processing apparatus 20. In the exemplary operation in FIG. 11, processes similar to those in FIG. 10 are designated with identical reference numerals, and will not be described. Specifically, in the exemplary operation in FIG. 11, processes similar to steps S21 to S251 in FIG. 10 are performed.

If the controller 41 determines that acquisition of the authentication information is to be performed in the cooperating device in step S251, the controller 41 transmits an electronic mail (prompt information) that describes a screen URL, by using which the flow starts, and that is used for prompting acquisition of the authentication information, to the mail address received in step S25 (in step S46). The controller 41 transmits the response of the preliminary call to the relay apparatus 30 (in step S47). It is not necessary to include any particular information in the response. Upon reception of the response which does not include a URL or the like from the flow management apparatus 40, the relay apparatus 30 invokes the flow (in step S48). In response to the invocation, the flow management apparatus 40 suspends the flow process.

The user U uses the PC 80 owned by the user U, to receive the electronic mail transmitted in step S46. The controller 81 of the PC 80 receives the mail, and displays a screen for prompting acquisition of the missing authentication information by, for example, clicking the URL described in the received mail. The user U checks the displayed screen, and uses the operation unit 83 to obtain the authentication information. Specifically, the user U may input, for example, the user ID and a password (user information). The controller 81 transmits the user information to the authentication information issuing apparatus 60 in accordance with information which is output from the operation unit 83 (in step S49). The authentication information issuing apparatus 60 issues authentication information corresponding to the received user information, and transmits it to the PC 80 as a response (in step S50). The controller 81 transmits the authentication information received from the authentication information issuing apparatus 60, to the authentication management apparatus 50 (in step S51). Upon reception of the authentication information from the PC 80, the authentication management apparatus 50 stores the received authentication information in the authentication information storage unit 531.

The processes in steps S46 to S51 described above are performed. Accordingly, even when any piece of authentication information required to execute the task processes corresponding to the specified flow is not stored in the authentication management apparatus 50, the missing authentication information is obtained on the basis of a user operation, and is stored in the authentication management apparatus 50.

After storage of the authentication information, for example, the user U specifies the URL for restarting the process which is transmitted in step S46, whereby an acquisition notification indicating that authentication information has been obtained is transmitted to the flow management apparatus 40, and the flow is requested to start (in step S52). Upon reception of the acquisition notification, the controller 41 of the flow management apparatus 40 obtains necessary authentication information from the authentication management apparatus 50 (in step S53), and starts execution of the task processes included in the specified flow (in steps S54 and S55). If necessary authentication information is not stored in the authentication management apparatus 50 in step S53, the controller 41 returns back to step S46, and performs again the process of prompting acquisition of the authentication information.

As described above, in execution of task processes by the flow management apparatus 40, a task process accessing an external service may require authentication information. In this case, when any piece of authentication information is missing, i.e., when authentication information required for the task process is not stored in the authentication management apparatus 50, an apparatus of the related art may fail to execute the task process, resulting in interruption of the flow process. When it is difficult for a user to input user information, for example, when the UI of the image processing apparatus 20 is poor, there is no way to continue the interrupted task process at that time. In contrast, in the exemplary embodiment, even when any piece of authentication information is missing, information for prompting acquisition of the authentication information is transmitted to a device other than the image processing apparatus 20 when necessary, preventing interruption of the process.

Modified Exemplary Embodiments

The above-described exemplary embodiment is an example of the present invention, and may be modified as follows. The modified exemplary embodiments described below may be combined with each other.

Figure 12:
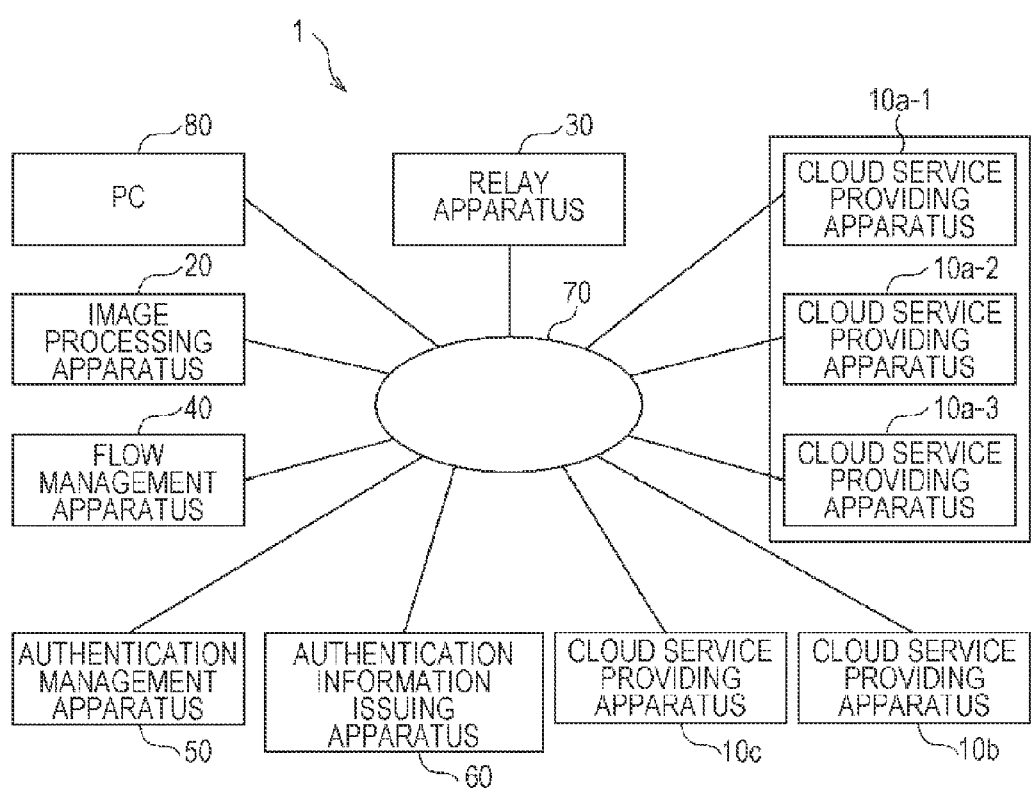
FIG. 12 is a block diagram illustrating the overall configuration of a communication system.

(1) The configuration of the communication system 1 is not limited to that described in the above-described exemplary embodiment. For example, the number of apparatuses included in the communication system 1 may be different from that in the exemplary embodiment. For example, in the above-described exemplary embodiment, an example in which the communication system 1 is provided with one image processing apparatus 20 is illustrated. The number of image processing apparatuses 20 is not limited to one, and may be more than one. In the above-described exemplary embodiment, one cloud service providing apparatus provides one cloud service. The present invention is not limited to this, and multiple servers may provide one cloud service. Specifically, for example, as illustrated in FIG. 12, cloud service providing apparatuses 10*a*-1, 10*a*-2, and 10*a*-3 may provide one cloud service.

In the above-described exemplary embodiment, one authentication management apparatus 50 and one authentication information issuing apparatus 60 are illustrated. The number of authentication management apparatuses 50 and the number of authentication information issuing apparatuses 60 are not limited to one, and may be more than one. For example, one cloud service may be provided with one authentication management apparatus 50 and one authentication information issuing apparatus 60.

(2) The image processing apparatus 20 described in the above-described exemplary embodiment is an exemplary client apparatus receiving provision of a service from cloud service providing apparatuses 10. The client apparatus may be an apparatus of another type, such as a personal computer, a tablet PC, a cellular phone, or a portable game device. In the above-described exemplary embodiment, the PC 80 is used as a cooperating device for the image processing apparatus 20. A cooperating device is not limited to a PC, and may be an apparatus of another type, such as a smartphone.

(3) In the above-described exemplary embodiment, the relay apparatus 30 and the flow management apparatus 40 are provided as separate apparatuses. The relay apparatus 30 and the flow management apparatus 40 may be provided as one unified apparatus.

(4) In the above-described exemplary embodiment, a device for displaying a screen for prompting acquisition of authentication information is determined depending on whether or not the UI of the image processing apparatus 20 is poor. The determination may be performed on the basis of another criterion instead of, or in addition to, poorness of the UI. For example, when a user does not want to input information (user information) for obtaining authentication information by using the image processing apparatus 20 because the image processing apparatus 20 is installed in a public location, information for prompting acquisition of authentication information may be transmitted to a cooperating device.

The way how to determine a transmission destination of the prompt information may be that, for example, setting information which has been set by a user is stored in a setting information storage unit 431 of the storage unit 43 (illustrated by using a dotted line in FIG. 5) in advance and that the second determination unit 144 refers to the setting information to determine the transmission destination of the prompt information. The setting information which is set by a user may be, for example, setting information using a time period. Another example is that a list of property data about the UI which correspond to model IDs is stored and that a user may set a condition, such as a condition in which information representing a screen for prompting acquisition of authentication information is to be transmitted to the PC 80 when the screen size is equal to or less than a threshold.

(5) In the above-described exemplary embodiment, a process in which a cloud service providing apparatus 10 is requested to perform a noise removal process or a character recognition process is used as an exemplary task process. A task process executed by the controller 41 of the flow management apparatus 40 is not limited to that described in the above-described exemplary embodiment, and various processes may be employed. For example, the controller 41 may instruct a cloud service providing apparatus 10 to read out data accumulated in the cloud service providing apparatus 10 and to transfer it to another cloud service providing apparatus 10.

(6) In the above-described exemplary embodiment, the prompt information transmission unit 145 of the flow management apparatus 40 transmits prompt information to the mail address corresponding to a user, thereby transmitting prompt information to a device cooperating with the image processing apparatus 20. The way to transmit prompt information to a cooperating device is not limited to this. For example, information for identifying the image processing apparatus 20 and information, e.g., the Internet Protocol (IP) address, for identifying a cooperating device for the image processing apparatus 20 are stored in the storage unit 27 in advance in such a manner as to be associated with each other. In such a configuration, the prompt information transmission unit 145 may transmit prompt information to the IP address corresponding to the image processing apparatus 20 which has transmitted the request.

Figure 10:
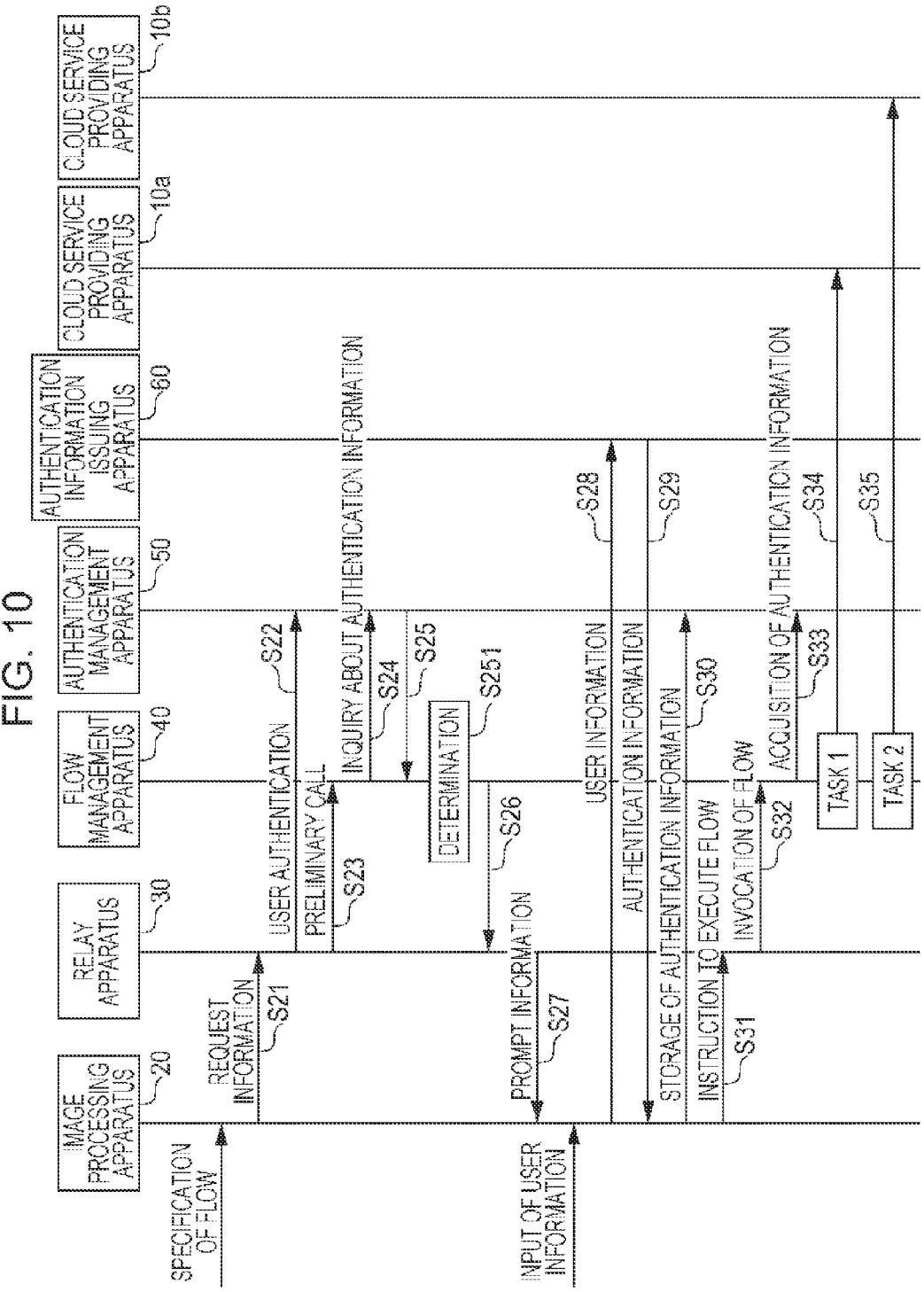
FIG. 10 is a sequence chart of a flow execution process.

(7) In the above-described exemplary embodiment, the image processing apparatus 20 receives prompt information from the relay apparatus 30 (in step S27 in FIG. 10). When a screen for prompting acquisition of authentication information is displayed, a button for transmitting the prompt information to the mail address of a user may be displayed in the screen for prompting acquisition of authentication information. In this case, when a user selects the button, the image processing apparatus 20 transmits the prompt information to the mail address corresponding to the user.

Figure 11:
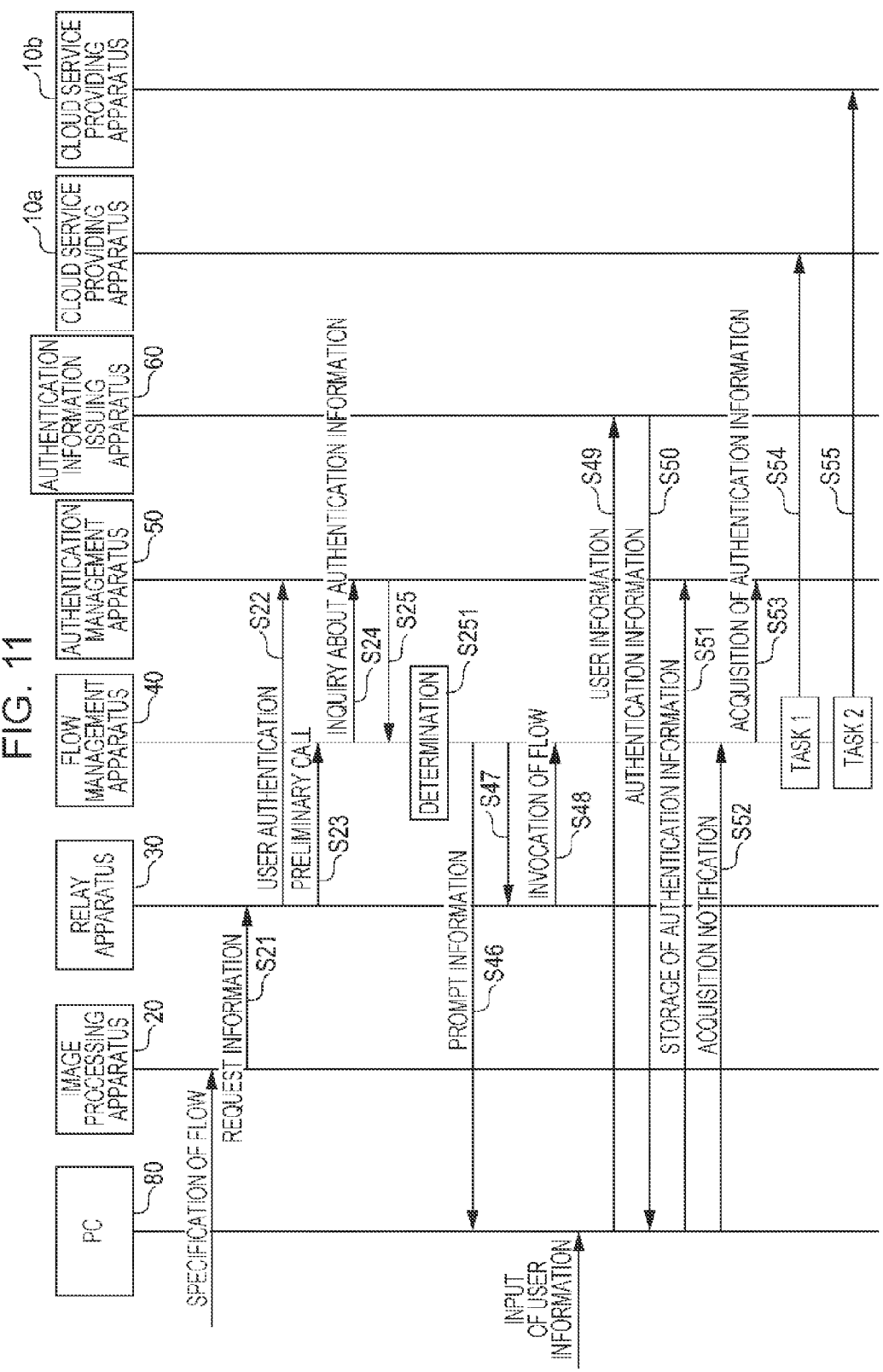
FIG. 11 is a sequence chart of a flow execution process.

In the above-described exemplary embodiment, if authentication information required for a flow is missing, the controller 41 determines whether or not acquisition of the authentication information is to be performed in the cooperating device (in step S251 in FIG. 11). If the controller 41 determines that acquisition of the authentication information is to be performed in the cooperating device, the controller 41 transmits prompt information to the mail address of the user (in step S46 in FIG. 11). In step S46 in FIG. 11, in addition to transmission of the prompt information to the mail address of the user, the prompt information may be transmitted also to the image processing apparatus 20. In this case, the user selects an apparatus in which acquisition of the authentication information is to be performed, from the PC 80 and the image processing apparatus 20, and obtains the authentication information in the selected apparatus.

(8) In the above-described exemplary embodiment, a model ID indicating the type of the image processing apparatus 20 is used as attribute information indicating a property of the image processing apparatus 20. The attribute information is not limited to a model ID, and may be other information. For example, the attribute information may be information indicating the location of the image processing apparatus 20, or information indicating the situation in which the image processing apparatus 20 is used (private use or public use). The attribute information may be any information as long as the information indicates a property of the image processing apparatus 20.

(9) Programs executed in the image processing apparatus 20, the relay apparatus 30, the flow management apparatus 40, and the PC 80 may be downloaded via a communication line such as the Internet. Alternatively, the programs may be provided by recording the programs in a computer-readable recording medium, such as a magnetic recording medium (e.g., a magnetic tape or a magnetic disk), an optical recording medium (e.g., an optical disk), a magneto-optical recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor configured to execute:
  a request information receiver configured to receive request information that requests one or more steps of information processing, from a client apparatus;
  an inquiry information transmitter configured to transmit inquiry information inquiring about a presence or lack of authentication information indicating that each of the one or more steps of information processing is permitted to be performed, to an authentication management apparatus;
  first determiner software configured to determine whether or not any piece of authentication information required for the one or more steps of information processing is missing, based on a response to the inquiry information from the authentication management apparatus;
  second determiner software configured to, in response to the first determiner software determining that any piece of authentication information is missing, determine whether or not prompt information requesting input, by a user, of the missing authentication information is to be transmitted to a second apparatus different from the client apparatus, based on predetermined information including attributes of a user interface on the client apparatus;
  a prompt information transmitter configured to, in response to the second determiner software determining that the prompt information is to be transmitted to the second apparatus, transmit the prompt information to the second apparatus;
  an acquisition information receiver configured to receive an acquisition notification indicating that the missing authentication information has been obtained, from the second apparatus; and
  process starter software configured to start the one or more steps of information processing in response to the acquisition information receiver receiving the acquisition notification.

2. The information processing apparatus according to claim 1, further comprising:
 a mail address receiver configured to receive a mail address corresponding to the user, who has requested the information processing, from the authentication management apparatus,
 wherein the prompt information transmitter is configured to transmit the prompt information to the mail address obtained by the mail address receiver.

3. The information processing apparatus according to claim 1, further comprising:
 a storage configured to store attribute information indicating a property of the client apparatus,
 wherein the second determiner software is configured to perform the determination based on the attribute information stored in the storage.

4. The information processing apparatus according to claim 2, further comprising:
 a storage configured to store attribute information indicating a property of the client apparatus,
 wherein the second determiner software is configured to perform the determination based on the attribute information stored in the storage unit.

5. A communication system comprising:
 a client apparatus; and
 an information processing apparatus,
 wherein the client apparatus includes
  a first processor configured to execute:
   a request information transmitter configured to transmit request information that requests one or more steps of information processing to the information processing apparatus, and
 wherein the information processing apparatus includes
  a second processor configured to execute:
   a request information receiver configured to receive the request information that requests the one or more steps of information processing, from a client apparatus,
   an inquiry information transmitter configured to transmit inquiry information inquiring about a presence or lack of authentication information indicating that each of the one or more steps of information processing is permitted to be performed, to an authentication management apparatus,
   first determiner software configured to determine whether or not any piece of authentication information required for the one or more steps of information processing is missing, based on a response to the inquiry information from the authentication management apparatus,
   second determiner software configured to, in response to the first determiner software determining that any piece of authentication information is missing, determine whether or not prompt information requesting input, by a user, of the missing authentication information is to be transmitted to a second apparatus different from the client apparatus, based on predetermined information including attributes of a user interface on the client apparatus,
   a prompt information transmitter configured to, in response to the second determiner software determining that the prompt information is to be transmitted to the second apparatus, transmit the prompt information to the second apparatus,
   an acquisition information receiver configured to receive an acquisition notification indicating that the missing authentication information has been obtained, from the second apparatus, and
   a process starter software configured to start the one or more steps of information processing in response to the acquisition information receiver receiving the acquisition notification.

6. A non-transitory computer readable medium storing a program causing a computer to execute a process comprising:
 receiving request information that requests one or more steps of information processing, from a client apparatus;

transmitting inquiry information inquiring about a presence or lack of authentication information indicating that each of the one or more steps of information processing is permitted to be performed, to an authentication management apparatus;

determining whether or not any piece of authentication information required for the one or more steps of information processing is missing, based on a response to the inquiry information from the authentication management apparatus;

in response to determining that any piece of authentication information is missing, determining whether or not prompt information requesting input, by a user, of the missing authentication information is to be transmitted to a second apparatus different from the client apparatus, based on predetermined information including attributes of a user interface on the client apparatus;

in response to determining that the prompt information is to be transmitted to the second apparatus, transmitting the prompt information to the second apparatus;

receiving an acquisition notification indicating that the missing authentication information has been obtained, from the second apparatus; and starting the one or more steps of information processing in response to the acquisition notification being received.

7. The information processing apparatus according to claim 1, wherein the client apparatus comprises a display, and
wherein the predetermined information includes information about a resolution of the display.

8. The information processing apparatus according to claim 1, wherein the predetermined information includes information about authentication information input methods provided by the client apparatus.

9. The communication system according to claim 5, wherein the client apparatus further comprises a display, and
wherein the predetermined information includes information about a resolution of the display.

10. The communication system according to claim 5, wherein the predetermined information includes information about authentication information input methods provided by the client apparatus.

11. The non-transitory computer readable medium according to claim 6, wherein the client apparatus comprises a display, and
wherein the predetermined information includes information about a resolution of the display.

12. The non-transitory computer readable medium according to claim 6, wherein the predetermined information includes information about authentication information input methods provided by the client apparatus.

* * * * *